US009631672B2

(12) United States Patent
Aiga et al.

(10) Patent No.: US 9,631,672 B2
(45) Date of Patent: Apr. 25, 2017

(54) SOLID-LUBRICATION ROLLING BEARING

(71) Applicant: NTN CORPORATION, Osaka (JP)

(72) Inventors: Hisanori Aiga, Mie (JP); Hiroki Manabe, Mie (JP); Naoaki Tsuji, Mie (JP); Takahiro Gotou, Aichi (JP); Yoshinori Ito, Aichi (JP); Fuminori Satoji, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/917,404

(22) PCT Filed: Sep. 16, 2014

(86) PCT No.: PCT/JP2014/074428
§ 371 (c)(1),
(2) Date: Mar. 8, 2016

(87) PCT Pub. No.: WO2015/041212
PCT Pub. Date: Mar. 26, 2015

(65) Prior Publication Data
US 2016/0223021 A1     Aug. 4, 2016

(30) Foreign Application Priority Data

Sep. 19, 2013  (JP) .................................. 2013-193699
Sep. 24, 2013  (JP) .................................. 2013-196466
(Continued)

(51) Int. Cl.
*F16C 33/37* (2006.01)
*F16C 33/66* (2006.01)
(Continued)

(52) U.S. Cl.
CPC ....... *F16C 33/6696* (2013.01); *C10M 103/02* (2013.01); *C10M 161/00* (2013.01);
(Continued)

(58) Field of Classification Search
CPC ...... F16C 33/6696; F16C 19/20; F16C 33/37; F16C 33/80
See application file for complete search history.

(56) References Cited

U.S. PATENT DOCUMENTS 3,162,493 A * 12/1964 Hanau ................. F16C 33/3831
384/527
3,712,694 A *  1/1973 Smith ..................... F16C 19/20
384/520
(Continued)

FOREIGN PATENT DOCUMENTS

JP   2002-70875   3/2002
JP   3550689      8/2004
(Continued)

OTHER PUBLICATIONS

International Preliminary Report on Patentability and Written Opinion of the International Searching Authority issued Mar. 22, 2016 in International (PCT) Application No. PCT/JP2014/074428.
(Continued)

*Primary Examiner* — Thomas R. Hannon
(74) *Attorney, Agent, or Firm* — Wenderoth, Lind & Ponack, L.L.P.

(57) ABSTRACT

A separator 8 including a solid lubricant is disposed between adjacent rolling elements 7. Relative movement of the adjacent rolling elements 7 and the separator 8 in a direction of separating apart in a circumferential direction is restricted by restricting members 10, and the restricting members 10 are disposed at plural locations in the circumferential direction. A minute gap α is provided between the adjacent restricting members 10, to allow relative movement therebetween. This can provide a solid-lubrication rolling bearing capable of stably preventing rotational locking and unintended disassembling of the bearing for a long period.

15 Claims, 18 Drawing Sheets

(30) Foreign Application Priority Data

Sep. 24, 2013 (JP) ................................ 2013-196467
Apr. 4, 2014 (JP) ................................ 2014-077916

(51) Int. Cl.
| | |
|---|---|
| *F16C 19/20* | (2006.01) |
| *C10M 103/02* | (2006.01) |
| *F16C 29/04* | (2006.01) |
| *F16C 33/80* | (2006.01) |
| *C10M 161/00* | (2006.01) |

(52) U.S. Cl.
CPC .............. *F16C 19/20* (2013.01); *F16C 29/04* (2013.01); *F16C 33/37* (2013.01); *F16C 33/80* (2013.01); *C10M 2201/041* (2013.01); *C10N 2240/02* (2013.01); *C10N 2250/18* (2013.01)

(56) References Cited

U.S. PATENT DOCUMENTS

| | | | | |
|---|---|---|---|---|
| 4,022,516 | A * | 5/1977 | Smith | .................. F16C 19/163 384/520 |
| 6,471,408 | B1 | 10/2002 | Ikeda et al. | |
| 2009/0274407 | A1 * | 11/2009 | Egami | ................ F16C 33/6633 384/606 |
| 2014/0153854 | A1 | 6/2014 | Arihana et al. | |
| 2014/0321776 | A1 * | 10/2014 | Hosoya | ................ C10M 103/00 384/13 |

FOREIGN PATENT DOCUMENTS

| | | |
|---|---|---|
| JP | 2006-17241 | 1/2006 |
| JP | 3934277 | 6/2007 |
| JP | 2012-67884 | 4/2012 |
| JP | 2013-79715 | 5/2013 |
| JP | 2013-87797 | 5/2013 |

OTHER PUBLICATIONS

International Search Report issued Dec. 16, 2014 in International (PCT) Application No. PCT/JP2014/074428.

\* cited by examiner

SOLID-LUBRICATION ROLLING BEARING

TECHNICAL FIELD

The present invention relates to a solid-lubrication rolling bearing using a solid lubricant.

BACKGROUND ART

The solid-lubrication rolling bearing is suitable for use at elevated temperatures or in a vacuum, which prevents use of grease or lubricating oil as a lubricant, for example, for use as a tenter clip bearing of a film stretching machine.

The film stretching machine herein is a machine for manufacturing a stretched film used in general packaging materials, liquid crystal panels, or secondary batteries. To improve the strength of the film, as illustrated in FIG. 29, the film stretching machine continuously transfers a film 100 in a longitudinal direction (direction of an arrow X), and stretches the film 100 in its width direction in a region expressed by a broken line while heating the film 100 (potentially, further stretches the film 100 in its longitudinal direction). The tenter clip is a mechanical component in the film stretching machine, which clips both ends of the film, and stably circulates along a caterpillar guide rail as illustrated by an arrow C in this figure to stretch the film in a predetermined direction. The tenter clip bearing is used in a portion that guides travelling of the tenter clip along the rail at elevated temperatures (250° C. or higher, and about 400° C. at maximum). Therefore, it is necessary to use the solid-lubrication rolling bearing.

In such conventional solid-lubrication rolling bearings, a separator formed of a solid lubricant is disposed between adjacent rolling elements without using a retainer (Patent literature 1 and Patent literature 2). In another conventional solid-lubrication rolling bearing, a retainer holds the separator and the rolling elements with rivets (Patent literature 3).

CITATION LIST

Patent Literature

Patent literature 1: U.S. Pat. No. 3,934,277
Patent literature 2: Japanese Unexamined Patent Application Publication No. 2012-67884
Patent literature 3: U.S. Pat. No. 3,550,689

SUMMARY OF THE INVENTION

Technical Problems

During the use of the solid-lubrication rolling bearing, the separator formed of solid lubricant is subjected to wear or crack due to contact with the rolling elements, and becomes gradually small. Thus, with the configuration having no retainer as described in Patent literature 1 and Patent literature 2, when the separator becomes small after long-term use, the rolling elements may be unevenly distributed in a partial circumferential region. Especially when all of the rolling elements move to a circumferential region of 180 degrees or less, the inner ring is separated from the outer ring with a small external force, and the bearing is disassembled unintendedly to be disabled. On the contrary, with the configuration described in Patent literature 3, the retainer keeps a distance between the adjacent rolling elements to avoid the above-mentioned trouble. However, in an initial state where the separator does not wear, since the degree of freedom of position between the rolling elements and the retainer is small, the wear powder of the separator is readily filled in gaps between a pocket face of the retainer and the rolling elements. This can obstruct rotation and revolution of the rolling elements to cause rotational locking.

An object of the present invention is to provide a solid-lubrication rolling bearing capable of stably preventing rotational locking and unintended disassembling of the bearing for a long period.

Solution to Problems

A solid-lubrication rolling bearing according to the present invention includes: an outer ring having an outer raceway face; an inner ring having an inner raceway face; a plurality of rolling elements disposed between the outer raceway face and the inner raceway face; and a separator disposed between the adjacent rolling elements, the separator being formed of a solid lubricant, relative movement of the adjacent rolling elements and the separator in a direction of separating apart in a circumferential direction is restricted by restricting members, and the restricting members are disposed at a plurality of places in the circumferential direction to allow relative movement between the adjacent restricting members.

With such configuration, a moving range of each rolling element in the circumferential direction is restricted by the restricting members. For this reason, even when the separator becomes smaller due to wear caused by the operation of the bearing, all of the rolling elements are prevented from being unevenly distributed in a partial circumferential region. Thus, the outer ring is not separated from the inner ring even after long-term operation, preventing unintended disassembling of the bearing.

Since the restricting members can individually move, the size of a gap between the rolling element and an inner side face of the restricting member can be flexibly changed. For this reason, discharging the solid lubricant powder accumulated in the gap can be promoted, preventing the gap from being filled with the solid lubricant powder to cause rotational locking. Since the restricting members are not connected to each other with a connecting member such as a rivet, there is no need to ensure a set-up space for the connecting member in the bearing in the circumferential direction. Thus, many rolling elements can be assembled in the bearing to increase a basic rated load of the bearing. Moreover, the operation of connecting the restricting members to each other becomes unnecessary, reducing man-hour at assembling of the bearing.

Preferably, the solid lubricant is formed by molding and firing powder that includes amorphous and self-sintering carbon material powder, graphite powder, and a binder.

The carbon material powder used in the solid lubricant is different from crystalline graphite due to its amorphous property, and is different from non self-sintering carbon fiber due to its self-sintering property. Examples of the amorphous and self-sintering carbon material powder include pitch powder and coke powder. Such carbon material powder is hardened by firing, and forms a skeleton structure in which adjacent carbon material particles are combined with each other after firing due to the self-sintering property. The graphite particles are held by the skeleton structure and thus, are hard to fall off. This can increase material strength and improve impact resistance and wear resistance.

A receptacle for the solid lubricant powder, which is provided on the axial outer side of the restricting member, can catch excess solid lubricant powder, thereby preventing leakage of the solid lubricant powder to the outside of the bearing.

In this case, the solid-lubrication rolling bearing may be further provided with a seal member that is disposed on the axial outer side of the restricting member and seals the space between the inner ring and the outer ring, and a shielding member that is opposed to the seal member in an axial direction and extends in a radial direction. When the shielding member extending in the radial direction is disposed on the axial outer side of the restricting member, solid lubricant powder generated in the separator hardly reaches the seal member, thereby effectively preventing leakage of the solid lubricant powder. The shielding member can also prevent fall-off of the restricting member.

The shielding member can be disposed on the axial inner side of the seal member to form a receptacle for the solid lubricant powder. For example, a recessed portion can be formed on the axial inner side face of the shielding member, or a recess can be formed between an axial outer side face of the shielding member and the seal member to form the receptacle for the solid lubricant powder.

A labyrinth gap is formed between the shielding member and the seal member, so that leakage of the solid-lubrication powder to the outside of the seal member is prevented more effectively.

Preferably, the solid-lubrication rolling bearing is provided with a structure that prevents contact between the outer ring and the separator. Thereby, even when the separator is sandwiched between the next rolling elements and pressed toward the outer ring, the solid lubricant in the separator never contacts the outer ring to cause wear. Thus, during operation of the bearing, especially under high oscillation or after long-term use, contact of the separator with the inner circumferential face of the outer ring can be prevented to eliminate wear more than necessary. The ability of the solid lubricant can be continuously demonstrated and the life of the bearing can be extended.

The structure for preventing contact between the separator and the outer ring may be formed of a metal plate fixed to the separator on the outer ring side. The structure may be formed of an arm that extends from the outer diameter end of the restricting member in the bearing axial direction and is disposed between the separator and the inner circumferential face of the outer ring, or male/female fitting between the separator and the restricting member. In either case, simple configuration can prevent the solid lubricant portion of the separator from contacting with the inner circumferential face of the outer ring. Therefore, wear of the separator is suppressed, so that the life of the separator, in turn, the solid-lubrication rolling bearing can be extended.

Preferably, the restricting members each are provided a bottom portion that extends between the outer ring and the inner ring in the circumferential direction, and a restricting portion that extends from the bottom portion in a space between the inner raceway face and the outer raceway face.

When the inner side face of each of the bottom portion and the restricting portion may be made a flat face having no curvature, discharge of the solid lubricant through the gap can be further promoted.

A sealing member that seals the space between the inner ring and the outer ring can be disposed on the axial outer side of the bottom portion of the restricting member, preventing the restricting member from falling off.

By making an outer diameter end and an inner diameter end of the bottom portion close to an inner circumferential face of the outer ring and an inner ring of the outer circumferential face, the bottom portion can keep generated solid lubricant powder around the raceway face. Thus, leakage of the solid lubricant powder to the outside of the bearing can be suppressed.

A pair of the restricting members are disposed on both axial sides of the rolling element and the separator, the pair of restricting members, and the rolling element and the separator that are accommodated within the restricting members are regarded as one unit, and the units are disposed at a plurality of places in the circumferential direction to allow relative movement between the units, thereby preventing leakage of the solid lubricant powder to the outside of the bearing more reliably.

When the restricting members may have the same shape, processing costs of the restricting members can be reduced to reduce costs of the solid-lubrication rolling bearing.

The above-mentioned solid-lubrication rolling bearing is especially suitable as a tenter clip bearing in a film stretching machine.

Advantageous Effects of Invention

The solid-lubrication rolling bearing according to the present invention can stably prevent rotational locking and unintended disassembling of the bearing for a long period.

DESCRIPTION OF EMBODIMENTS

Configuration of the present invention will be described below with reference to FIG. 1 to FIG. 28.

Figure 1:
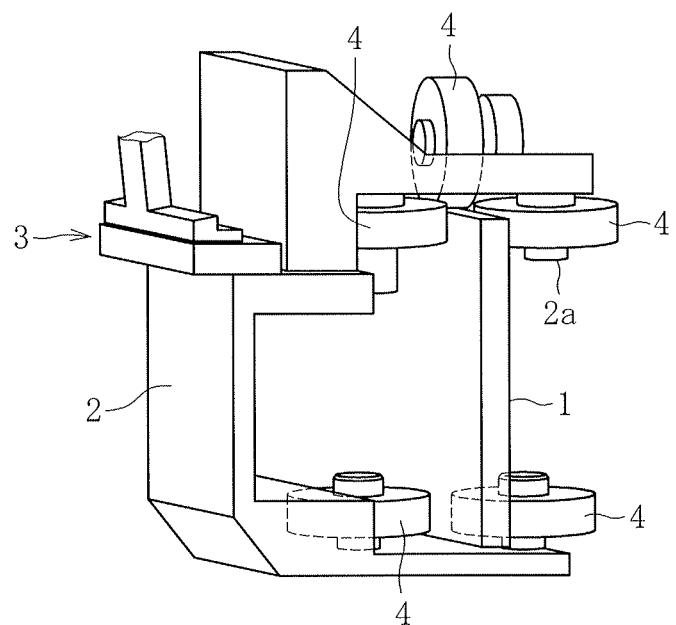
FIG. 1 is a perspective view illustrating schematic structure of a tenter clip.
Figure 29:
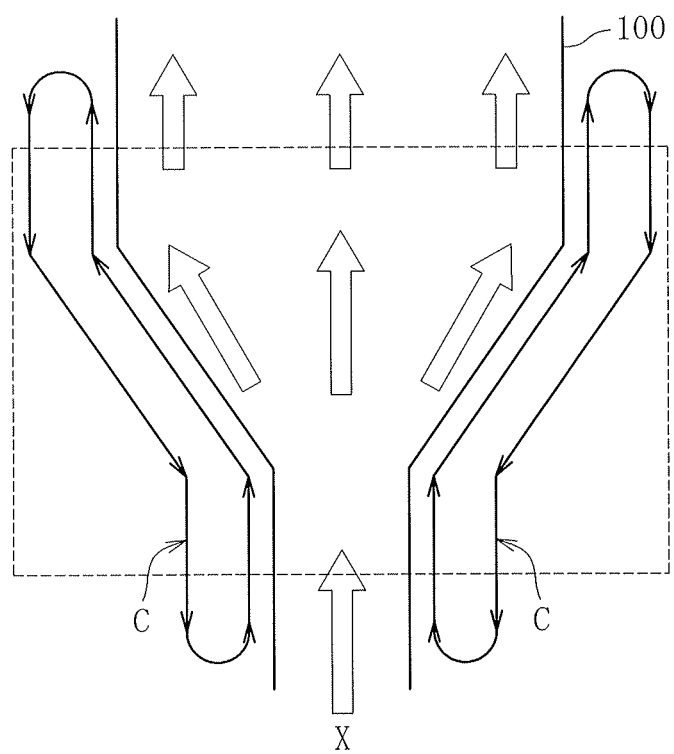
FIG. 29 is a plan view illustrating schematic configuration of a film stretching machine.

FIG. 1 illustrates schematic structure of a tenter clip of a film stretching machine, to which a solid-lubrication rolling bearing according to the present invention can be applied. As described above, the tenter clip moves under guide of a caterpillar guide rail 1, and includes a frame 2, a clip 3 that clips a film 100 (See FIG. 29), and a plurality of bearings 4 rotatably supported by the frame 2. The tenter clip is driven by a chain not illustrated to travel. At this time, an outer circumferential face of each of the bearings 4 rolls on the guide rail 1, thereby moving the tenter clip along the guide rail 1 to stretch a film clipped by the clip 3. Another ring-like member engaged with an outer circumferential face of an outer ring of the bearing may roll on the guide rail 1.

First Embodiment

Figure 2:
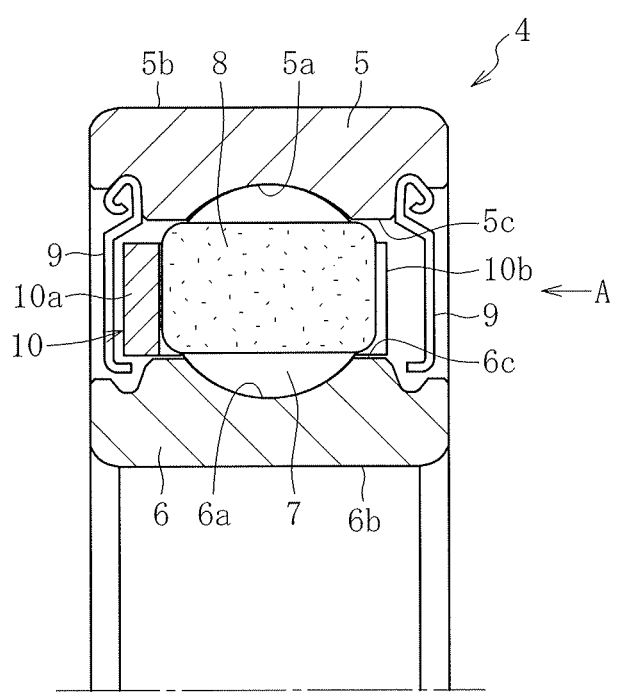
FIG. 2 is a sectional view illustrating a solid-lubrication rolling bearing in accordance with a First embodiment.
Figure 3:
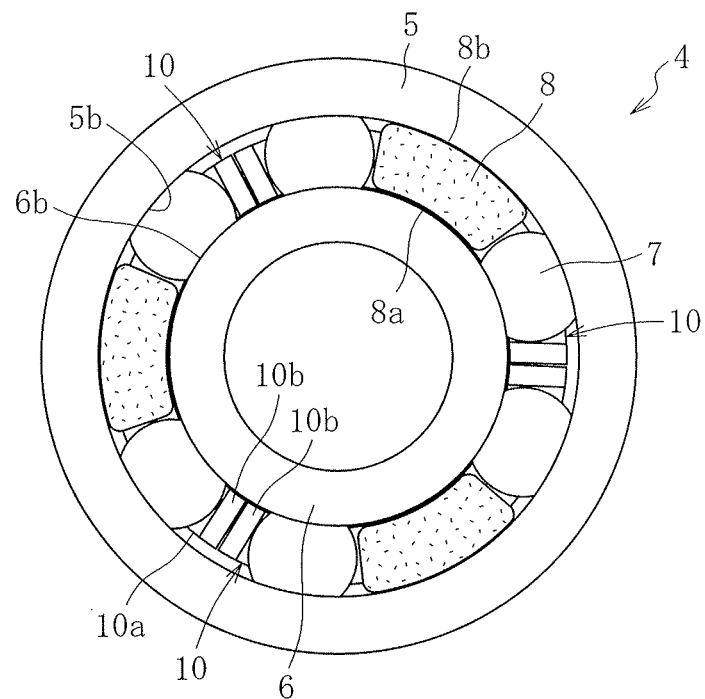
FIG. 3 is a front view illustrating the solid-lubrication rolling bearing when viewed from an A direction in FIG. 2.

FIG. 2 is a sectional view illustrating a solid-lubrication rolling bearing 4 for a tenter clip in accordance with a first embodiment, and FIG. 3 is a front view of the bearing 4 in FIG. 2 when viewed from an A direction (however, a right shield plate 9 in FIG. 2 is removed). The bearing 4 is shaped as a deep groove ball bearing, and includes, as main constituents, an outer ring 5 having an outer raceway face 5a on its inner circumferential face, an inner ring 6 having an inner raceway face 6a on its outer circumferential face, a plurality of (six in this embodiment) rolling elements 7 such as balls disposed between the outer raceway face 5a and the inner raceway face 6a, a plurality of (six in this embodiment) separators 8 disposed between the adjacent rolling elements 7, and a sealing member 9 that seals a space between the outer ring 5 and the inner ring 6 on both axial sides. In the bearing 4 in this embodiment, the outer circumferential face 5b of the outer ring 5 becomes a rolling face that rolls on the guide rail 1 in FIG. 1, and an inner circumferential face 6b of the inner ring 6 fixedly engages with a fixed shaft 2a provided at the frame 2.

The sealing member 9 is formed of a shield plate, for example. An outer diameter end of the shield plate 9 is fixedly press-fitted into a circumferential groove in the inner circumferential face of the outer ring 5, and an inner diameter end of the shield plate 9 comes close to the outer circumferential face of the inner ring 6. This configuration forms a non-contact seal. A contact seal may be formed by bringing the inner diameter end of the sealing member 9 into slide contact with the outer circumferential face of the inner ring 6.

The outer ring 5, the inner ring 6, and the rolling elements 7 are made of steel, for example, martensitic stainless steels such as SUS440C. The rolling elements may be made of ceramics, and examples of the ceramics include silicon nitride. When the rolling elements 7 are not made of ceramics, the rolling elements 7 are preferably coated with a solid-lubrication material such as graphite. Preferably, the shield plate 9 is made of steel, for example, austenitic stainless steels such as SUS304 having excellent corrosion resistance.

The separator 8 is formed of solid lubricant. The solid lubricant may have any composition. For example, the separators 8 may be made of a solid-lubrication material including a layered substance such as graphite, molybdenum disulfide, and tungsten disulfide, soft metal such as gold, silver, and lead, or polymer resin composite such as PTFE and polyimide, or a composite material containing the solid-lubrication material as a main ingredient. For example, the separators 8 may be formed by molding and firing graphite powder, or molding and firing powder containing graphite as a main ingredient along with a binder.

The separators 8 may have any shape, and in this embodiment, the separators 8 each are partially cylindrical. The thickness of the separator 8 in the radial direction is slightly smaller than a difference between a radius of the inner circumferential face of the outer ring 5 (shoulder face 5c adjacent to the outer raceway face 5a) and a radius of the outer circumferential face of the inner ring 6 (shoulder face 6c adjacent to the inner raceway face 6a). An axial dimension of the separator 8 is larger than an axial dimension of the outer raceway face 5a and the inner raceway face 6a. Accordingly, during rotation of the bearing, the outer circumferential faces and the inner circumferential faces of the separators 8 at both axial ends can slidingly contact the shoulder faces 5c, 6c of the outer ring 5 and the inner ring 6.

Figure 9A:
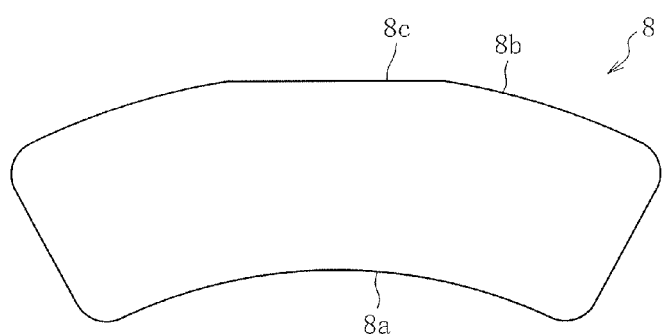
FIG. 9a is a front view illustrating a separator when viewed in the axial direction.
Figure 9B:
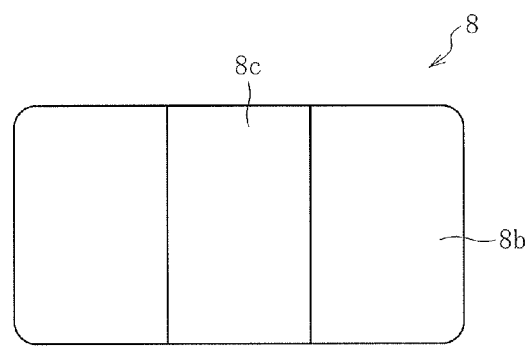
FIG. 9b is a plan view illustrating the separator in the radial direction.

In FIG. 3, inner circumferential faces 8a (faces opposed to the outer circumferential face of the inner ring 6) and outer circumferential faces 8b (faces opposed to the inner circumferential face of the outer ring 5) of the separators 8 each are a cylindrical face using the axis as the center. However, as illustrated in FIG. 9a and FIG. 9b, a flat face 8c may be formed in a circumferential central region of the outer circumferential faces 8b of the separator 8.

Figure 4:
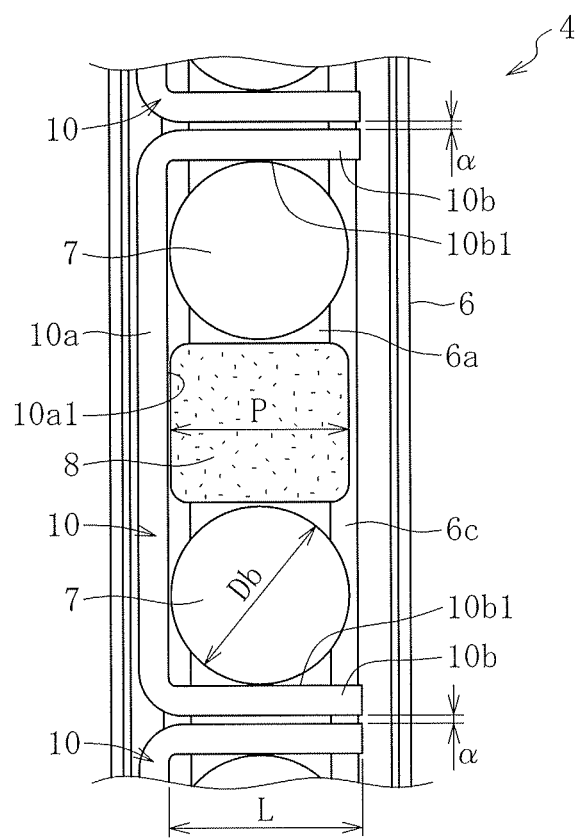
FIG. 4 is a partial exploded view illustrating the solid-lubrication rolling bearing in FIG. 2 when viewed from the outer diameter side, with an outer ring being removed.

The solid-lubrication rolling bearings 4 each further include, as a main constituent, restricting members 10 that hold the adjacent rolling element 7 and separator 8 from both circumferential sides to restrict relative movement of the rolling element 7 and separator 8 in a direction of separating apart in the circumferential direction. Configuration of the restricting members 10 will be described below in detail with respect to FIG. 4 and FIG. 5. FIG. 4 is a partial exploded view illustrating the solid-lubrication rolling bearing 4 in FIG. 2 when viewed from the outer diameter side, with the outer ring 5 being removed, and FIG. 5 is a perspective view illustrating the restricting member 10.

Figure 5:
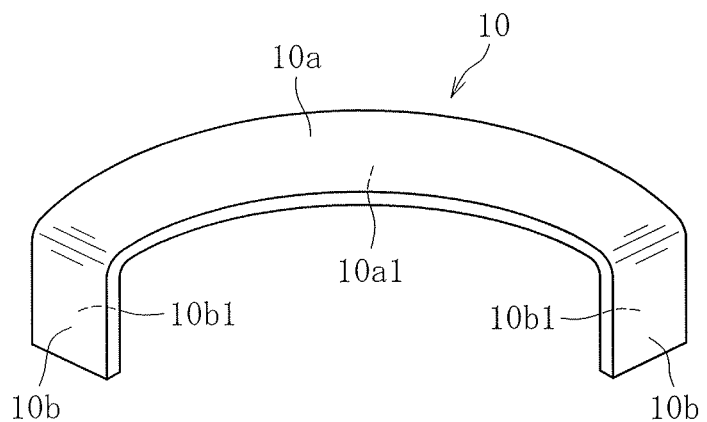
FIG. 5 is a perspective view illustrating a restricting member.

As illustrated in FIG. 4 and FIG. 5, the restricting members 10 each have a bottom portion 10a extending between the outer ring 5 and the inner ring 6 in the circumferential direction, and restricting portions 10b extending from both circumferential ends of the bottom portion 10a in a direction perpendicular to the face of the bottom portion 10a (axial direction), in an integral manner. All of inner side face 10a1 of the bottom portion 10a and the inner side faces 10b1 of the restricting portions 10, which are opposed to the rolling elements 7 and the separator 8, are flat faces having no curvature. As illustrated in FIG. 4, an axial length L of the restricting portion 10b (especially, inner side face 10b1) is slightly larger than a diameter Db of the rolling element 7 and an axial dimension P of the separator 8 (L>Db, L>P).

The restricting members 10 each have a thickness of about 0.1 mm to 1.0 mm (in FIG. 2 to FIG. 4, for clarity, the thickness of the restricting member 10 is exaggerated), and can be manufactured by pressing, for example, a metal thin plate. The restricting members 10 may be made of any material, for example, an iron-based material such as stainless steel, or iron-based material coated with chromium plating or the like for ensuring corrosion resistance. Alternatively, the restricting members 10 may be formed of any solid lubricant.

As illustrated in FIG. 2 and FIG. 3, the bottom portion 10a of the restricting member 10 is disposed between the inner circumferential face of the outer ring 5 and the outer circumferential face of the inner ring 6, and the restricting portions 10b are disposed in a space between the outer raceway face 5a of the outer ring 5 and the inner raceway face 6a of the inner ring 6. Specifically, the bottom portion 10a extends between the inner circumferential face of the outer ring 5 and the outer circumferential face of the inner ring 6 in the bearing circumferential direction, and is perpendicular to the rotational center of the bearing. The restricting portions 10b extend from both circumferential ends of the bottom portion 10a in the bearing axial direction, and cross the revolution track of the rolling element 7. At least one rolling element 7 and at least one separator 8 are disposed between the two restricting portions 10b of the restricting member 10. In this embodiment, the two rolling elements 7 are disposed between the two restricting portions 10b restricting member 10, and one separator 8 is disposed between the two rolling elements 7. That is, the two rolling elements 7 and one separator 8 are arranged as one set. A circumferential size of the inner side faces 10b1 of the two restricting portions 10b of the restricting member 10 is set such that the rolling elements 7 and the separator 8 between the inner side faces 10b1 can slightly move in the circumferential direction.

As illustrated in FIG. 3 and FIG. 4, the restricting members 10 are continuously disposed at a plurality of (preferably, three or more) places in the circumferential direction. At this time, all of the restricting members 10 have the same shape. No rolling element 7 and separator 8 are disposed between the restricting portions 10b of the adjacent restricting members 10, and the restricting portions 10b are opposed to each other in the circumferential direction. Accordingly, all of the rolling elements 7 and the separators 8 are disposed between a pair of the restricting portions 10b of any restricting member 10. The adjacent restricting members 10 are not connected to each other, and as illustrated in FIG. 4, a circumferential minute gap $\alpha$ is present between the opposed restricting portions 10b of the adjacent restricting members 10. For this reason, the adjacent restricting members 10 can move with respect to each other in the circumferential direction.

A radial dimension of the restricting member 10 is slightly smaller than a difference between a radius of the shoulder face 5c of the outer ring 5 and a radius of the shoulder face 6c of the inner ring 6, and the outer diameter end and the inner diameter end of the bottom portion 10a are close to the inner circumferential face (shoulder face 5c) of the outer ring 5 and the outer circumferential face (shoulder face 6c) of the inner ring 6, respectively. In this embodiment, a gap between the inner diameter end of the bottom portion 10a and the shoulder face 6c of the inner ring 6 is smaller than a gap between the outer diameter end of the bottom portion 10a and the shoulder face 5c of the outer ring 5. The minute gap $\alpha$ between the adjacent restricting members 10 can be set such that the inner diameter end of the bottom portion 10a do not contact the outer circumferential face (shoulder face 6c) of the inner ring 6. However, the gap may be set such that the inner diameter end of the bottom portion 10a temporarily contacts the outer circumferential face (shoulder face 6c) of the inner ring 6 during rotation of the restricting member 10, if this causes no problem. Since the bottom portion 10a is thick in FIG. 2, the outer diameter end of the bottom portion 10a contacts the shield plate 9, and do not contact the inner circumferential face of the outer ring 5 (shoulder face 5c). However, thinning the bottom portion 10a may cause the outer diameter end of the bottom portion 10a to contact the inner circumferential face of the outer ring 5.

The restricting members 10 are assembled between the outer ring 5 and the inner ring 6 in the same orientation such that the bottom portions 10a are disposed on one axial side of the bearing. The restricting members 10 may be equally oriented, or may be partially turned (for example, alternatively turned). The restricting members 10 may be assembled in any stage before or after assembling the rolling elements 7 and the separators 8 between the outer ring 5 and the inner ring 6. Upon completion of assembling of the rolling elements 7, the separators 8, and the restricting members 10, the shield plate 9 is press-fitted into a circumferential groove of the outer ring 5 to complete the solid-lubrication rolling bearing 4 illustrated in FIG. 2. In this state, since the restricting members 10 are constrained by the sealing member 9 from the axial outer side, the restricting members 10 do not fall out of the bearing 4. To constrain movement of the restricting members 10 to the opening side (right side in FIG. 2), a ring-like member may be attached to the outer ring 5 (or the inner ring 6) and the member is disposed between the right shield plate 9 and a front end of the restricting portion 10a to contact the front end of the restricting portion 10a.

In the solid-lubrication rolling bearing 4 thus configured, during rotation of the bearing, the rotating and revolving rolling element 7 contact the separator 8, so that the separator 8 are shaved to generate solid lubricant powder (including small pieces of the solid lubricant). The solid lubricant powder is transferred and attached onto the outer raceway face 5a and the inner raceway face 6a. Therefore, the bearing 4 are stably lubricated without lubricating oil, grease, or the like.

The separators 8 become smaller during operation of the bearing due to wear. In this case, however, since the moving range of each rolling element 7 in the circumferential direction is restricted by the restricting members 10, all of the rolling elements 7 are prevented from being unevenly distributed in a partial circumferential region. For this reason, the outer ring 5 is not separated from the inner ring 6 after long-term operation, thereby preventing unintended disassembling of the bearing. When three or more restricting members 10 are used as in this embodiment, the situation where all of the rolling elements 7 move in a region of 180 degrees or less never occurs theoretically. Thus, the above trouble can be reliably prevented.

With such configuration, the restricting members 10 can relatively move in all directions (axial direction, circumferential direction, and radial direction). Consequently, even in an initial stage (wear of the separators 8 does not worsen), dimension of gaps between the rolling element 7, and the inner side faces 10a1, 10b1 of the restricting member 10 can be flexibly changed. Thus, discharging of the solid lubricant powder accumulated in the gaps can be promoted, so that the solid lubricant powder can be prevented from filling the gaps to cause rotational locking. The effect of promoting discharging of the solid lubricant powder from the gaps can be further enhanced by forming the inner side face 10a1 of the bottom portion 10a and the inner side faces 10b1 of the restricting portions 10b as flat faces having no curvature.

Since a connecting member such as a rivet used in the bearing in Patent literature 3 becomes unnecessary, there is no need to ensure a set-up space for the connecting member in the circumferential direction. Thus, many rolling elements 7 can be incorporated in the bearing to increase the basic rated load of the bearing. Further, the operation of connecting the restricting members 10 to each other becomes unnecessary, so that man-hour at assembling of the bearing can be reduced to achieve cost reduction.

Further, since the outer diameter end and the inner diameter end of the bottom portion 10a of the restricting members 10 are made close to the inner circumferential face of the outer ring 5 and the outer circumferential face of the inner ring 6, the bottom portion 10a can shield the solid lubricant powder generated by contact between the rolling elements 7 and the separators 8 to keep the solid lubricant powder near the raceway faces 5a, 6a. Thus, leakage (especially, leakage to the left in FIG. 2) of the solid lubricant powder to the outside of the bearing can be reliably prevented.

Since the restricting members 10 have the same shape, processing costs of the restricting members 10 can be reduced, so that costs of the solid-lubrication rolling bearings 4 can be further reduced.

Second Embodiment

Figure 7:
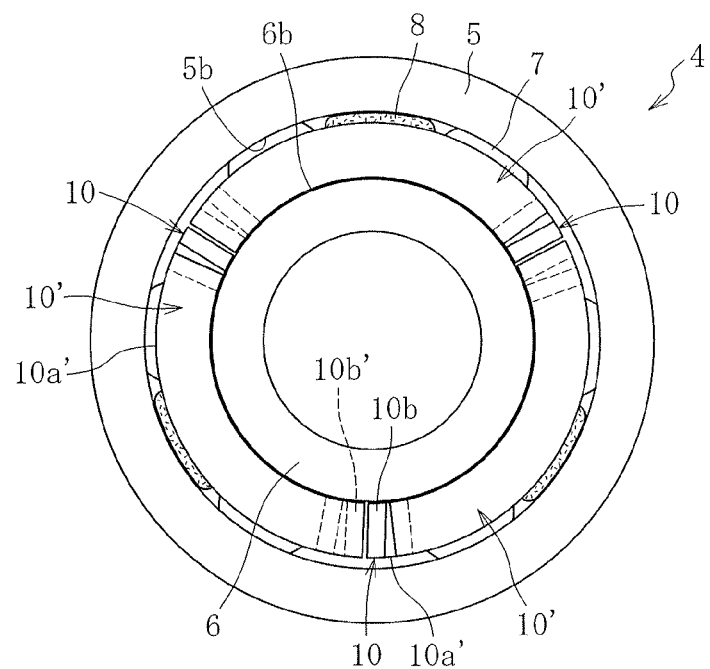
FIG. 7 is a front view illustrating the solid-lubrication rolling bearing when viewed in an A direction in FIG. 6.
Figure 8:
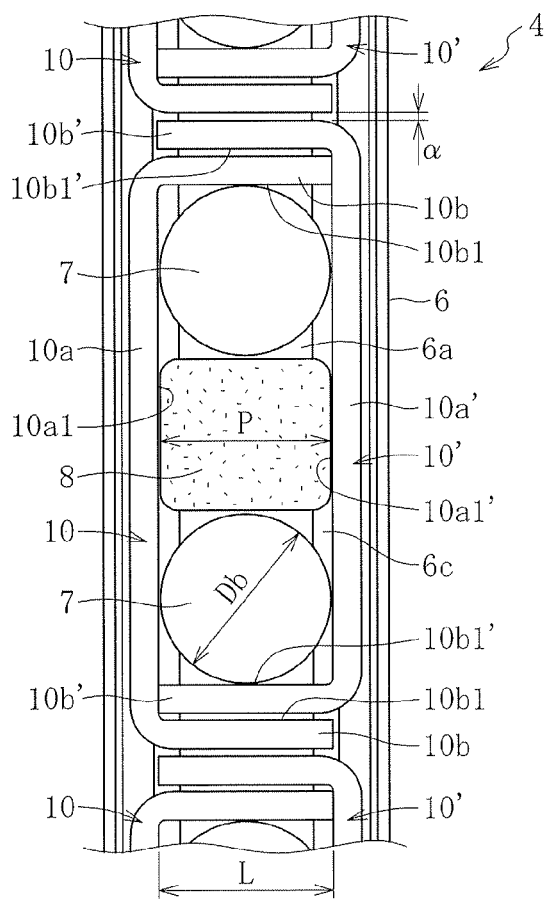
FIG. 8 is a partial exploded view illustrating the solid-lubrication rolling bearing in FIG. 6 when viewed from the outer diameter side, with an outer ring being removed.

Next, a solid-lubrication rolling bearing in accordance with a second embodiment of the present invention will be described with reference to FIG. 6 to FIG. 8.

In the second embodiment, a pair of the restricting members 10, 10' are disposed on one axial side of the rolling elements 7 and the separators 8. Detailed configuration of this embodiment will be described below. In the second embodiment, portions of the restricting members 10' on the other axial side, out of the pair of restricting members 10, 10', which correspond to portions of the restricting members 10 on one axial side, are given common reference numerals followed by symbol (').

In the second embodiment, in the pair of restricting members 10, 10', the bottom portion 10a, 10a' are opposed to each other in the axial direction, and the restricting portions 10b, 10b' are opposed to each other in the circumferential direction. The pair of restricting members 10, 10' are not connected to each other. The same number of rolling elements 7 and separator 8 as the rolling elements 7 and separator 8 in the first embodiment are stored in a space surrounded with inner side faces 10a1, 10a1' of the bottom portions 10a, 10a', the inner side faces 10b1 of the restricting portions 10b of the restricting member 10 on one axial side, and inner side faces 10b1' of the restricting portions 10b' of the restricting member 10' on the other axial side. An axial length L of each of the restricting portions 10b, 10b' (a minimum axial distance between the inner side faces 10a1, 10a1' of the opposed bottom portion 10a, 100 is slightly larger than a diameter Db of the rolling element 7 and an axial dimension P of the separator 8 (L>Db, L>P), such that front ends of the restricting portions 10b, 10b' can contact the bottom portions 10a', 10a of the corresponding restricting members.

In the bearing 4 in this embodiment, the pair of restricting members 10, 10', the rolling elements 7, and the separator 8 are used as one unit, and the units are disposed at a plurality of places (three places in the figure) in the circumferential direction. A minute gap α being the same as the first embodiment is formed between the adjacent units in the circumferential direction. The other configuration is the basically same as that in the first embodiment.

The configuration in the second embodiment can achieve the same effect as the configuration in the first embodiment. The restricting members 10, 10' are prevented from falling off by shield plates 9 on both axial sides. With the configuration in the second embodiment, since the bottom portion 10a, 10a' are disposed on the both axial sides of the rolling elements 7 and the separator 8, leakage of the solid lubricant powder to both axial sides can be suppressed, thereby preventing leakage of the solid lubricant to the outside of the bearing more reliably. Although the restricting portions 10b, 10b' of the pair of restricting members 10, 10' are loosely engaged with each other, the restricting portions 10b, 10b' may be tightly engaged with each other to integrate the unit.

Next, a third to fifth embodiments of the solid-lubrication rolling bearings 4 according to the present invention will be described with reference to FIG. 10 to FIG. 14. The third to fifth embodiment can prevent leakage of the solid lubricant powder into the outside of the bearing more stably.

Third Embodiment

Figure 10:
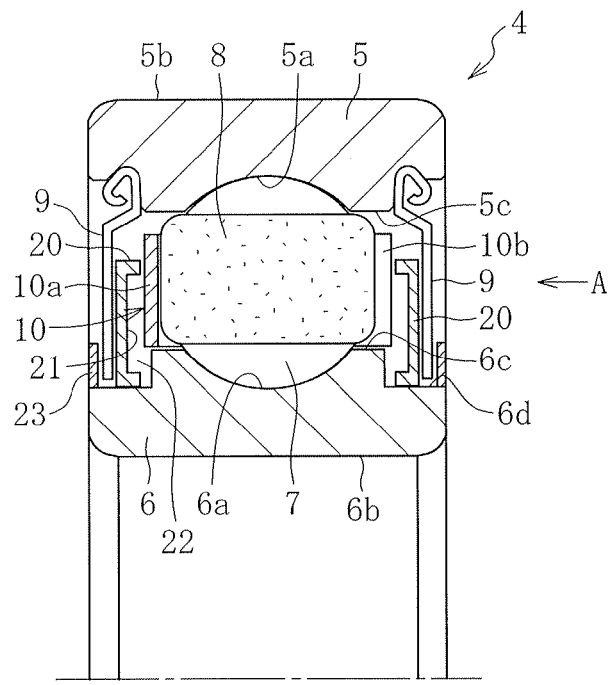
FIG. 10 is a sectional view illustrating the solid-lubrication rolling bearing in accordance with a third embodiment.
Figure 11:
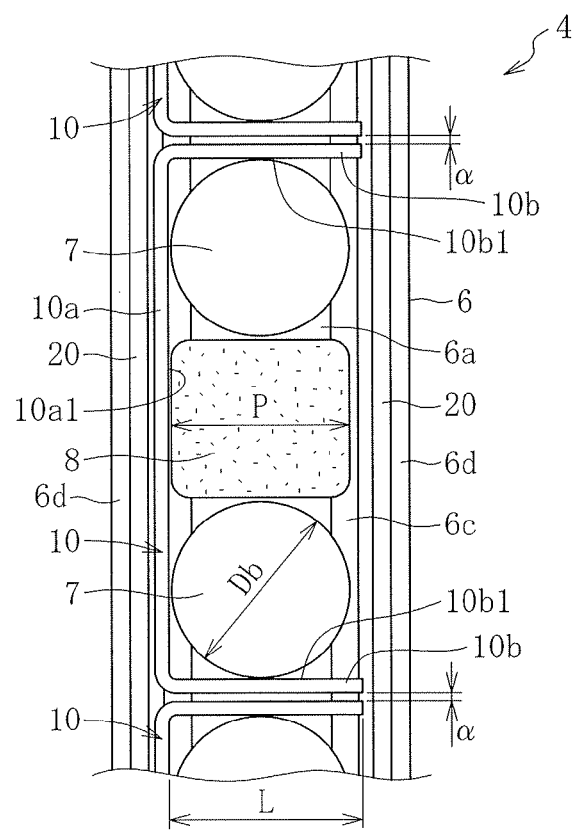
FIG. 11 is an exploded view illustrating the solid-lubrication rolling bearing in FIG. 10 when viewed from the outer diameter side, with an outer ring being removed.

As illustrated in FIG. 10 and FIG. 11, a solid-lubrication rolling bearings 4 in a third embodiment basically have the same configuration as that of the solid-lubrication rolling bearing in the first embodiment (FIG. 2). However, this embodiment is different from the first embodiment in that two types of shielding members 20, 23 extending in the radial direction are provided as main constituents.

Both of the two types of shielding members 20, 23 are thin and annular, and are disposed on both axial sides of the sealing member 9 as opposed to the sealing member 9 in the axial direction. Hereinafter, out of the two types of shielding members 20, 23, the shielding member 20 located on the axial inner side of the sealing member 9 is referred to as "first shielding member", and the shielding member 23 located on the axial outer side is referred to as "second shielding member". The first shielding member 20 and the second shielding member 23 as one set are disposed on both axial sides of the bearing 4. In the third embodiment, the inner diameter end of the sealing member 9 straightly extends in the radial direction.

An annular recess 21 is formed in the axial inner side face of the first shielding member 20. As described later, the recess 21 functions as a receptacle 22 for the solid lubricant powder. The axial outer side face of the first shielding member 20 is a flat face extending in the radial direction. The first shielding members 20 are loose-fitted to seal faces 6d formed at both axial ends of the inner circumferential face of the inner ring 6, and can slightly move in the axial direction within the range of contact with the restricting members 10 and the seal member. The first shielding members 20 can be fixed to the respective seal faces 6d of the inner ring by press-fitting or the like. In this case, a minute axial gap is formed between the axial outer side face of the first shielding member 20 and the axial inner side face of the opposing sealing member 9.

The second shielding members 23 each are disc-shaped such that both axial faces are flat faces extending in the radial direction. The second shielding member 23 is fixed to the seal face 6d of the inner ring 6 by press-fitting or the like, with a minute axial gap between its axial inner side face and the axial outer side face of the sealing member 9.

The restricting members 10 are assembled between the outer ring 5 and the inner ring 6 in the same orientation such that the bottom portions 10a are disposed on one axial side of the bearing. The restricting members 10 may be assembled in any stage before or after assembling the rolling elements 7 and the separators 8 between the outer ring 5 and the inner ring 6. Upon completion of assembling of the rolling elements 7, the separators 8, and the restricting members 10, the first shielding members 20 are assembled, the shield plate 9 is fixedly press-fitted into a circumferential groove of the outer ring 5, and the second shielding member 23 is fixedly press-fitted into a small-diameter face 6d of the inner ring 6 to complete the solid-lubrication rolling bearing 4 illustrated in FIG. 10. In this state, since the restricting members 10 are constrained by the sealing member 9 via the first shielding members 20 from the axial outer side, the restricting members 10 do not fall out of the bearing 4.

In the solid-lubrication rolling bearing 4 thus configured, during rotation of the bearing, the rotating and revolving rolling element 7 contact the separator 8, so that the separator 8 formed of the solid lubricant 11 is shaved to generate solid lubricant powder (including small pieces of the solid lubricant). The solid lubricant powder is transferred and attached onto the outer raceway face 5a and the inner raceway face 6a, so that the bearing 4 is stably lubricated without lubricating oil, grease, or the like.

If excess solid-lubrication powder is generated in the bearing, the excess solid lubricant powder is caught and stored in the receptacles 22 of the first shielding members 20 provided on the axial outer side of the restricting member 10. For this reason, the solid lubricant powder is hard to reach the seal gap between the sealing member 9 and the small-diameter face 6d of the inner ring 6, so that leakage of the solid lubricant powder to the outside of the bearing can be suppressed.

In addition, an axial gap between the axial outer side face of the first shielding member 20 and the axial inner side face of the sealing member 9, an axial gap between the axial inner side face of the second shielding member 23 and the axial outer side face of the sealing member 9, and a seal gap between the inner diameter end of the sealing member 9 and the seal face 6d constitute a communicating labyrinth gap. The labyrinth gap further enhance the sealing effect, thereby preventing leakage of the solid lubricant powder to the outside of the bearing more reliably. Thus, when the solid-lubrication rolling bearing 4 is used as a tenter clip bearing, degrading of the film due to leakage of the solid lubricant powder to the outside can be prevented.

Fourth Embodiment

Figure 12:
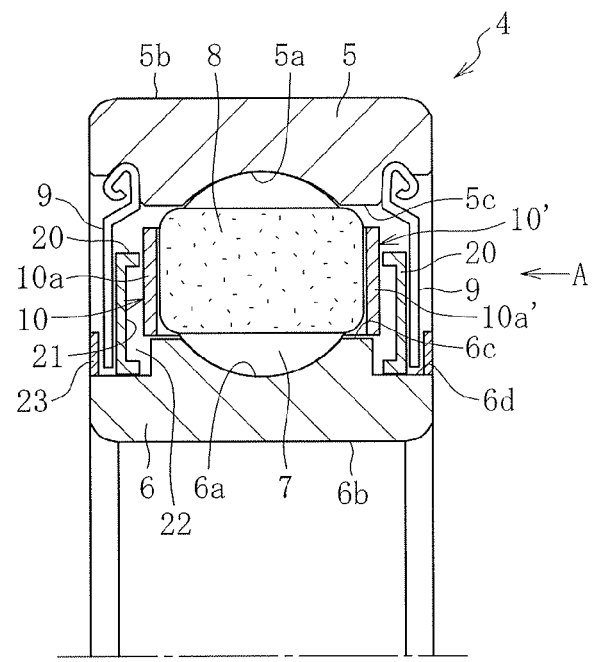
FIG. 12 is a sectional view illustrating the solid-lubrication rolling bearing in accordance with a fourth embodiment.
Figure 13:
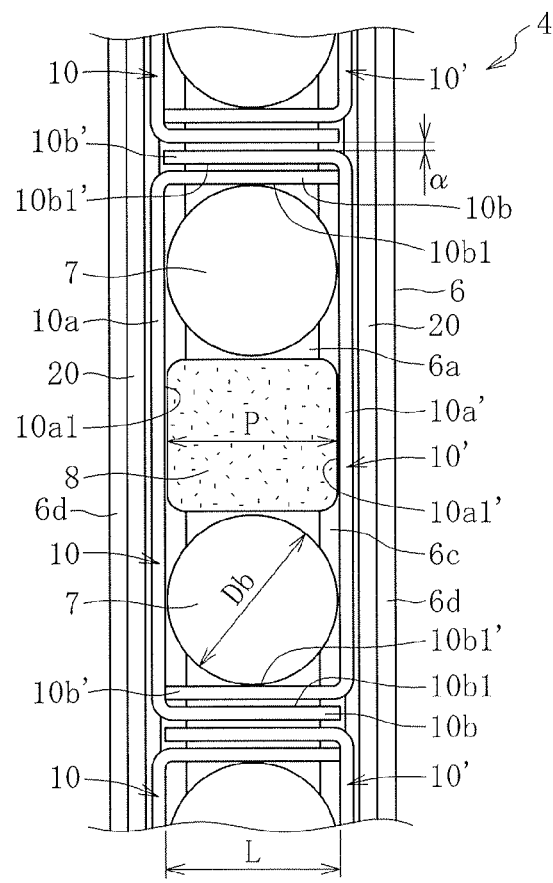
FIG. 13 is an exploded view illustrating the solid-lubrication rolling bearing in FIG. 12 when viewed from the outer diameter side, with an outer ring being removed.

Next, a fourth embodiment will be described with reference to FIG. 12 and FIG. 13. A solid-lubrication rolling bearing 4 in the fourth embodiment is configured by adding two types of shielding members 20, 23 extending in the radial direction as in the third embodiment to the solid-lubrication rolling bearing 4 in the second embodiment in which the restricting members 10, 10' are disposed on both axial sides of the rolling elements 7 and the separators 8 (See FIG. 6 to FIG. 8). The configuration of the fourth embodiment can achieve the same effects as that of the third embodiment.

Fifth Embodiment

Next, a fifth embodiment of the present invention will be described with reference to FIG. 14. In the fifth embodiment, the shape of the labyrinth gap in the fourth embodiment is modified.

Figure 14:
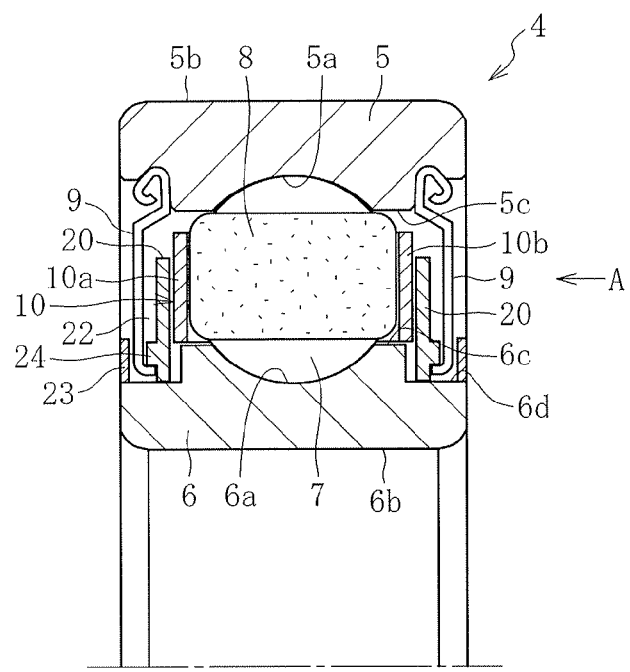
FIG. 14 is a sectional view illustrating the solid-lubrication rolling bearing in accordance with a fifth embodiment.
Figure 15:
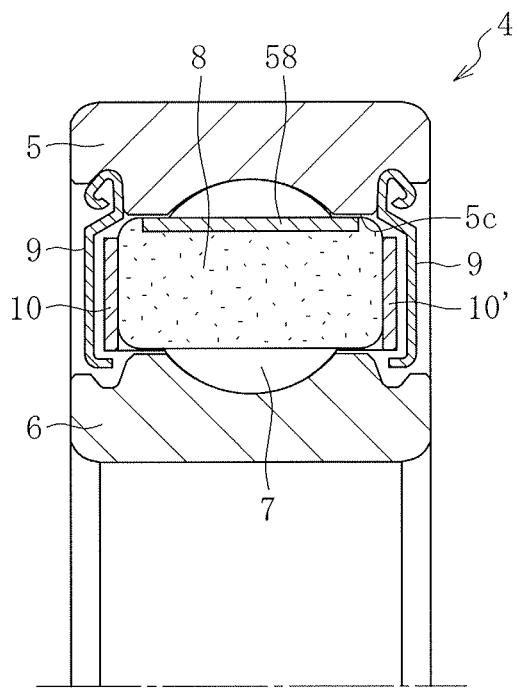
FIG. 15 is a sectional view illustrating the solid-lubrication rolling bearing in accordance with a sixth embodiment.
Figure 16:
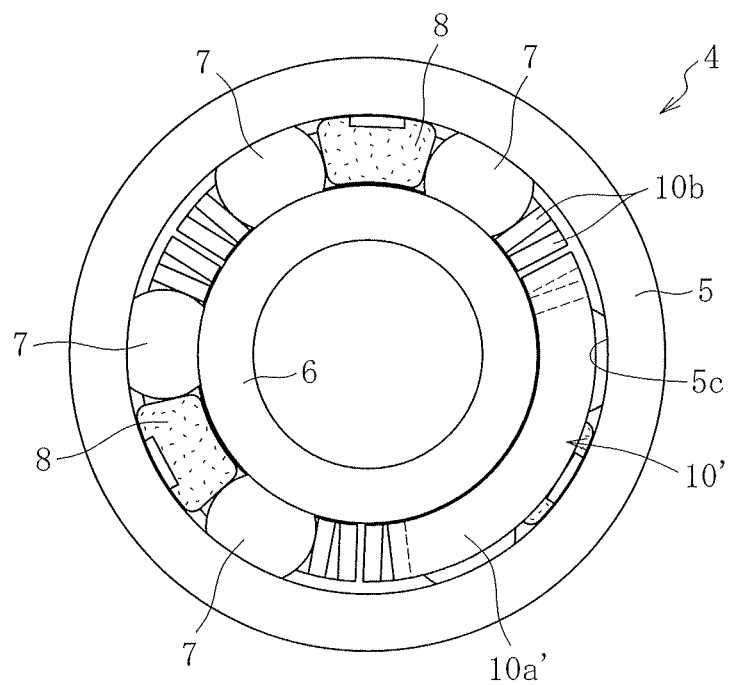
FIG. 16 is a front view illustrating the solid-lubrication rolling bearing in FIG. 15, with a shield plate being removed.
Figure 17:
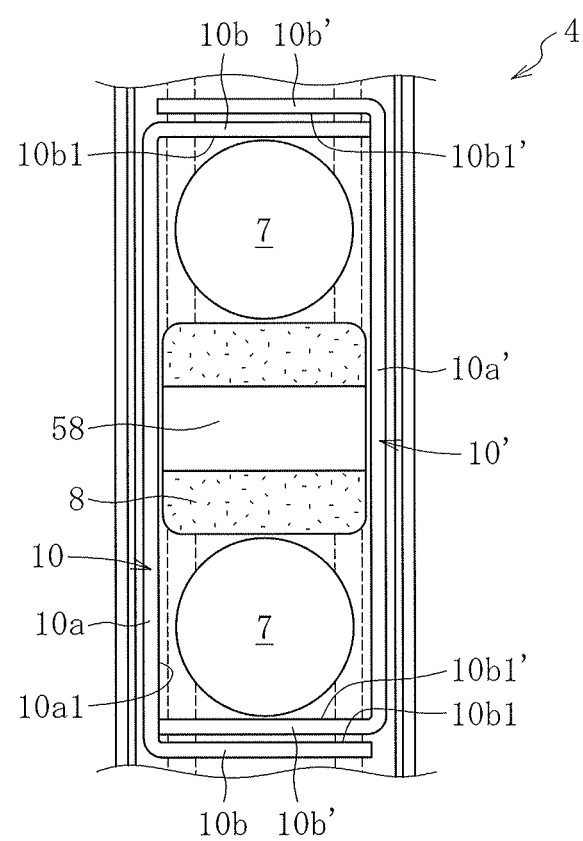
FIG. 17 is a partial exploded view illustrating the solid-lubrication rolling bearing in FIG. 15 when viewed from the outer diameter side, with an outer ring being removed.

As illustrated in FIG. 14, in the fifth embodiment, the axial inner side face of the first shielding member 20 is a flat face straightly extending in the radial direction. A protruding portion 24 protruding toward the axial outer side is formed on an inner radial portion of the axial outer side face of the first shielding member 20. The inner diameter end of the sealing member 9 is bent toward the axial inner side so as to conform to the inner radial shape of the protruding portion 24.

In the fifth embodiment, (1) gaps between each of the axial outer side face of the protruding portion 24, the inner radial face of the protruding portion 24, and the axial outer side face on the inner radial side of the protruding portion 24 of the first shielding member 20, and the inner diameter end of the sealing member 9, (2) the axial gap between the axial inner side face of the second shielding member 23 and the axial outer side face of the sealing member 9, (3) the seal gap between the inner diameter end of the seal member 9 and the seal face 6d, constitutes a communicating labyrinth gap. A recess that is wider than the labyrinth gap is formed between the axial outer side face on the outer radial side of the protruding portion 24 of the first shielding member 20 and the axial inner side face of the sealing member 9, and the recess constitutes the receptacle 22 for the solid lubricant powder. FIG. 14 illustrates the solid-lubrication rolling bearing 4 in the fourth embodiment illustrated in FIG. 12, in which the restricting members 10, 10' are disposed on both axial sides of the rolling elements 7. However, the first shielding members 20 and the sealing member 9 in the fifth embodiment can be also applied to the solid-lubrication rolling bearing 4 in the third embodiment illustrated in FIG. 10, in which the restricting member 10 is disposed on one axial side of the rolling elements 7.

Next, sixth to eighth embodiments of the solid-lubrication rolling bearings 4 according to the present invention will be described with reference to FIG. 15 to FIG. 25*a*, FIG. 25*b*, and FIG. 25*c*. In the sixth to eighth embodiment, a structure that prevents contact between the face of the separator 8 on the outer ring side and the inner circumferential face 5*c* of the outer ring 5 is provided.

In the solid-lubrication rolling bearing, in which the separator formed of the solid lubricant is interposed between the rolling elements without using a retainer, as described in Patent literature 1, under high oscillation or during long-term use, the separator is subjected to a centrifugal force, and further is biased toward the outer radial side by the adjacent rolling elements. As a result, the face of the separator on the outer ring side contacts the inner radial face of the outer ring, and early wears. As the separator becomes smaller, powder (ex. wear powder) generated due to wear is accumulated, and the rolling elements are displaced in the bearing circumferential direction. Since the separator revolves with the rolling elements, during rotation of the bearing, the separator can contact the rolling elements and the outer ring. Since the circumferential speed of the separator is higher than the rotational speed of the rolling element, contact between the separator and the inner circumferential face of the outer ring acts to promote wear of the separator.

Sixth Embodiment

A sixth embodiment will be described below with reference to FIG. 15 to FIG. 18*a*, and FIG. 18*b*. The sixth embodiment is based on the second embodiment (FIG. 6) in configuration of the restricting members 10, but may be based on the first embodiment (FIG. 2).

The solid-lubrication rolling bearing 4 in the sixth embodiment is different from the solid-lubrication rolling bearing 4 in the second embodiment (FIG. 6) in that a structure that prevents contact between the separator 8 and the inner circumferential face of the outer ring 5 is provided on the separator 8, and is the substantially same as the solid-lubrication rolling bearing 4 in the second embodiment except for the above configuration. Specifically, a metal plate 58 is fixed to the outer circumferential face of the separator 8, and the metal plate 58 is guided by the inner circumferential face 5*c* of the outer ring 5. Like the separator 8 illustrated in FIG. 9*a*, FIG. 9*b*, this separator 8 has a flat face 8*c* at the circumferential center of an outer circumferential face 8*b*, and the metal plate 58 forms the flat face 5*c*. The metal plate 58 prevents direct contact between the solid lubricant of the separator 8 and the inner circumferential face 5*c* of the outer ring 5. This can prevent wear of the separator 8 more than necessary. When the rolling elements 7 are made of ceramics having a smaller specific gravity than steel, a pressing force of the rolling elements 7 to press the separator 8 toward the outer radial side becomes smaller, so that wear of the separator 8 can be more effectively suppressed.

Figure 18A:
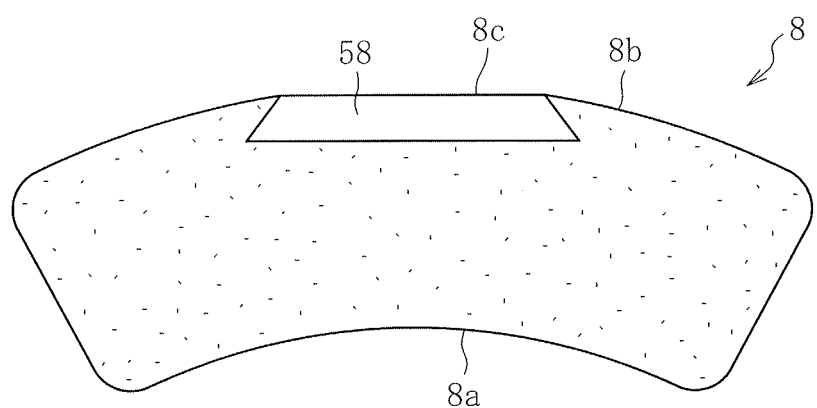
FIG. 18a is a front view illustrating a separator when viewed in the axial direction.
Figure 18B:
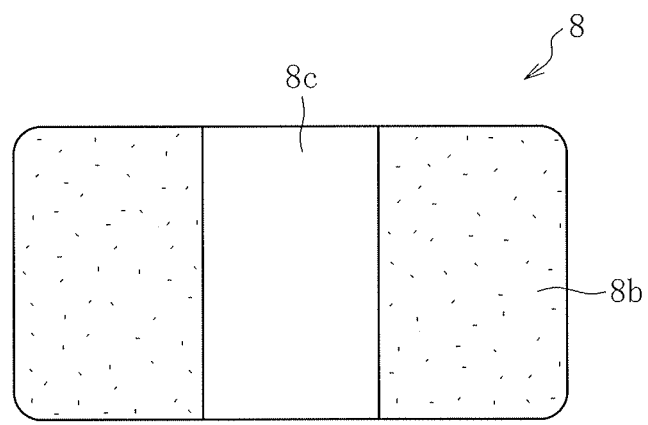
FIG. 18b is a plan view illustrating the separator when viewed from the outer diameter side.

The metal plate 58 can be fixed to the separator 8 by utilizing shrinkage of the separator 8 at firing. At this time, as illustrated in FIG. 18*a*, FIG. 18*b*, with dovetail joint or similar configuration, both members are hardly separated from each other. That is, a groove having a trapezoidal transverse face extending in the bearing axial direction is formed in the outer circumferential face of the separator 8, and the trapezoidal metal plate 58 is inserted into the groove. Since a base of the trapezoidal transverse face of the metal plate 58 is longer than a top side, and the separator 8 is pressed toward the outer ring 5 by the adjacent rolling elements 7, the metal plate 58 is not readily separated from the solid lubricant of the separator 8. Examples of the material for the metal plate 58 include SUS and iron-based material coated with chrome plating or the like.

Seventh Embodiment

Figure 19:
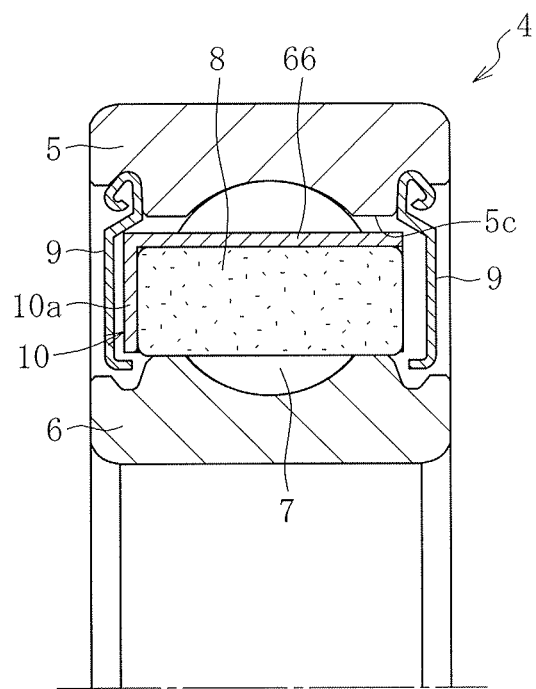
FIG. 19 is a sectional view illustrating the solid-lubrication rolling bearing in accordance with a seventh embodiment.
Figure 20:
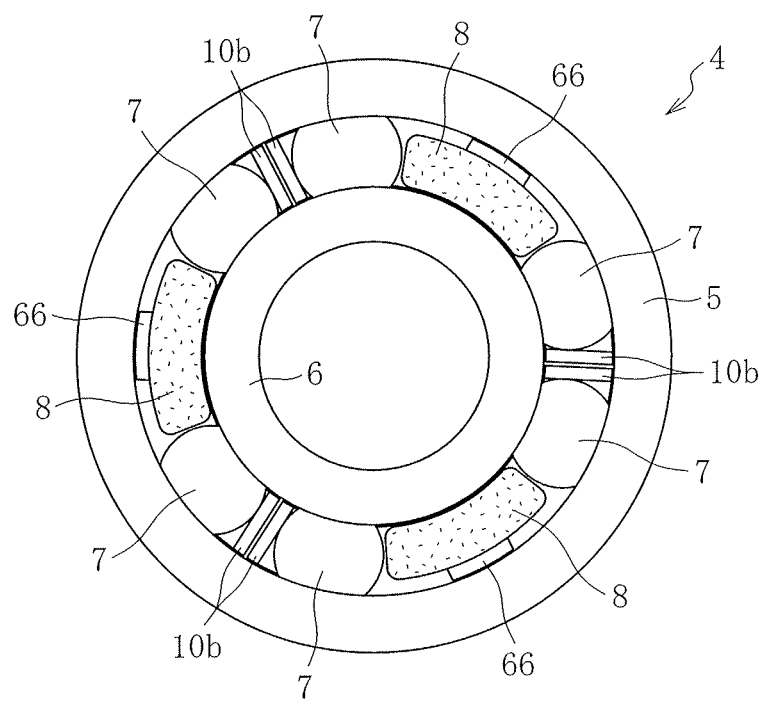
FIG. 20 is a front view illustrating the solid-lubrication rolling bearing in FIG. 19, with a shield plate being removed.
Figure 21:
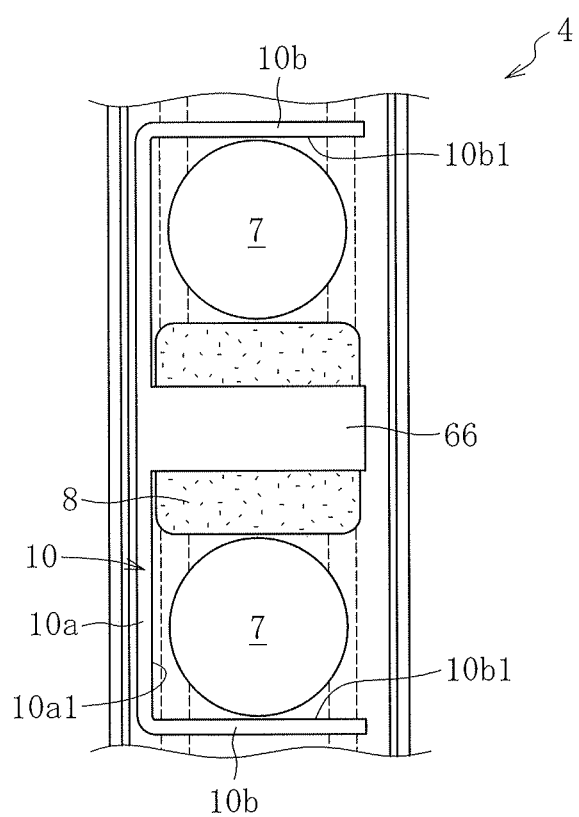
FIG. 21 is a partial exploded view illustrating the solid-lubrication rolling bearing in FIG. 19 when viewed from the outer diameter side, with an outer ring being removed.

Next, a seventh embodiment of the present invention will be described with reference to FIGS. 19 to 21.

A bearing 4 in the seventh embodiment is different from the first embodiment (FIG. 2) in that a structure that prevents contact between the separator 8 and the inner circumferential face 5*c* of the outer ring 5 is provided integrally with the restricting member 10, and is the substantially same as that in the first embodiment except for the above configuration. To prevent direct contact between the separator 8 and the inner circumferential face 5*c* of the outer ring 5, an arm 66 extending from the outer diameter end of the bottom portion 10*a* in the axial direction is provided at the center of the restricting member 10 in the circumferential direction. The arm 66 is disposed between the separator 8 and the inner circumferential face 5*c* of the outer ring 5 to prevent direct contact between the separator 8 and the inner circumferential face 5*c*.

A face of the separator 8, which contacts the bottom portions 10*a* of the restricting members 10 is preferably, a flat face. The examples illustrated in FIG. 19 to FIG. 21 are based on the first embodiment (FIG. 2), and the restricting member 10 is opened to one axial side (right side in FIG. 19). Accordingly, on the opened side of the restricting member 10, when the separator 8 moves in the axial direction, the separator contacts the shield plate 9. Thus, a ring for preventing direct contact between the separator 8 and the shield plate 9 may be provided. Alternatively, a free end of the arm 66 may be bent toward the inner radial side, and be hung on the separator 8 to restrict movement of the separator 8 in the axial direction.

Figure 6:
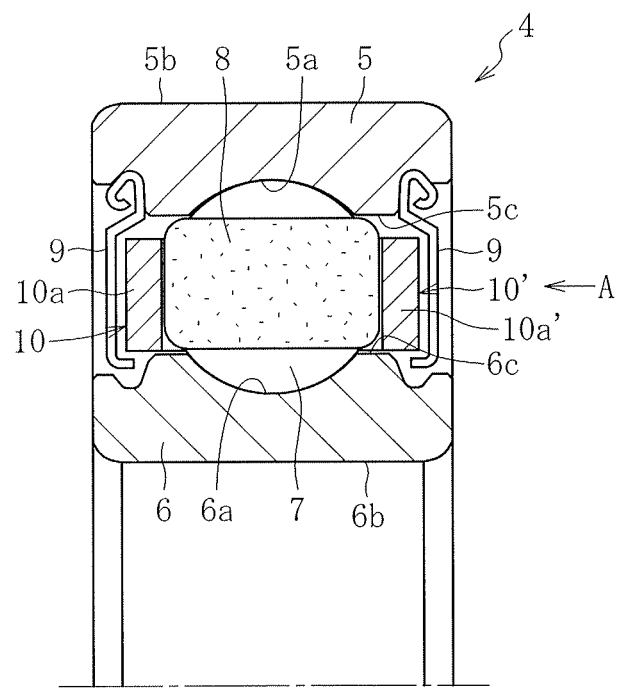
FIG. 6 is a sectional view illustrating the solid-lubrication rolling bearing in accordance with a second embodiment.

The seventh embodiment is based on the first embodiment (FIG. 2) in configuration of the restricting members 10, but may be based on the second embodiment (FIG. 6). In this case, by displacing the arms 66 in the circumferential direction, when the two restricting members 10, 10' are disposed opposed to each other, the arms 66 do not match in the axial direction and interfere with each other. Alternatively, the arm 66 may be provided on one of the two restricting members 10, 10'. In this case, however, two types of restricting members are required.

Eighth Embodiment

Next, an eighth embodiment of the present invention will be described with reference to FIG. 22 to FIG. 25*a*, FIG. 25*b*, and FIG. 25*c*.

A solid-lubrication rolling bearing 4 in the eighth embodiment has the substantially same configuration as the solid-lubrication rolling bearing 4 in the second embodiment (FIG. 6) in restricting members 10. A difference is that, to prevent contact between the separator 8 and the inner circumferential face 5*c* of the outer ring 5, the separator 8 and the restricting members 10 cooperate to limit movement of the separator 8 in the radial direction.

More specifically, the separator 8 is similar to the separator 8 illustrated in FIGS. 9*a* to 9*c* in that the separator includes an inner circumferential face 8*a*, an outer circumferential face 8*b*, and a flat portion 8*c*, but is different from the separator 8 illustrated in FIGS. 9*a* to 9*c* in that the separator includes protruding portions 53 on both axial end faces. The protruding portions 53 extend in parallel to the inner circumferential face 8a and accordingly, upper faces 55 (outer radial faces) extend in parallel to the inner circumferential face 8a. A notch 66 for receiving the protruding portion 53 of the separator 8 is formed at the circumferential center on the inner periphery of the bottom portion 10a of the restricting member 10. The protruding portions 53 of the separator 8 are inserted into the respective notches 66. For convenience, the relation between the protruding portion 53 and the notch 66 is referred to as male/female fitting.

Figure 22:
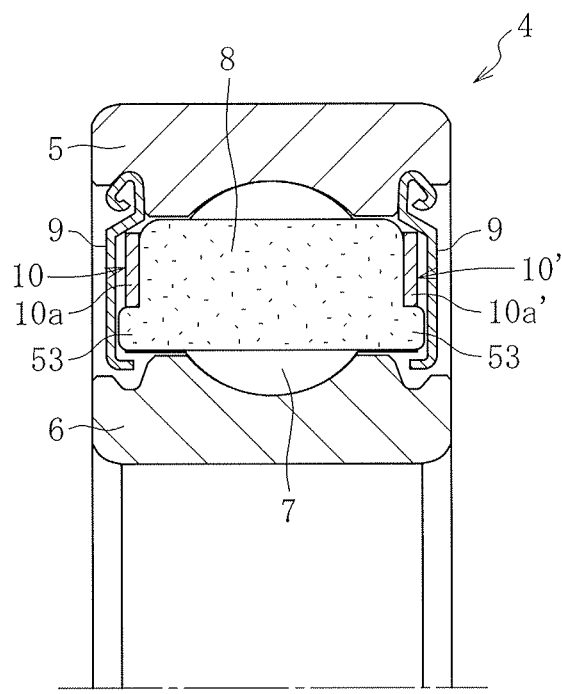
FIG. 22 is a sectional view illustrating the solid-lubrication rolling bearing in accordance with an eighth embodiment.
Figure 23:
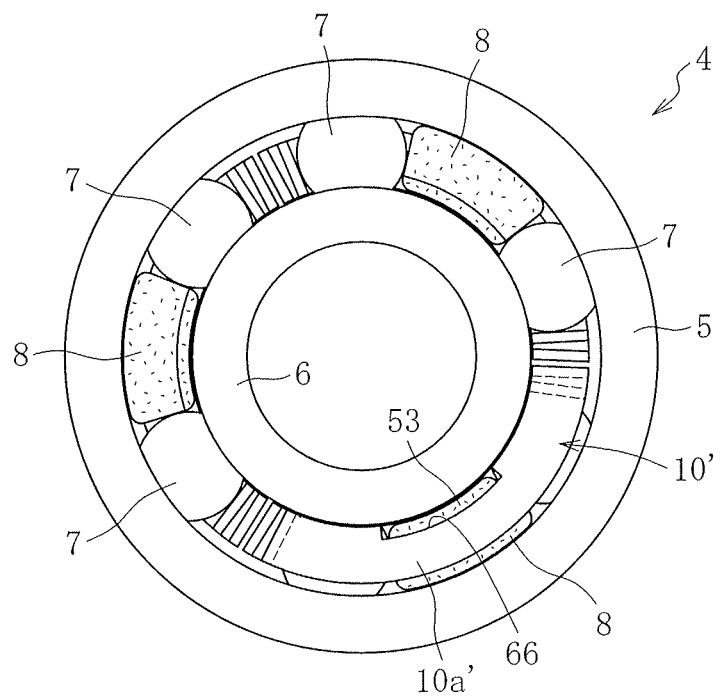
FIG. 23 is a front view illustrating the solid-lubrication rolling bearing in FIG. 22, with a shield plate being removed.
Figure 24:
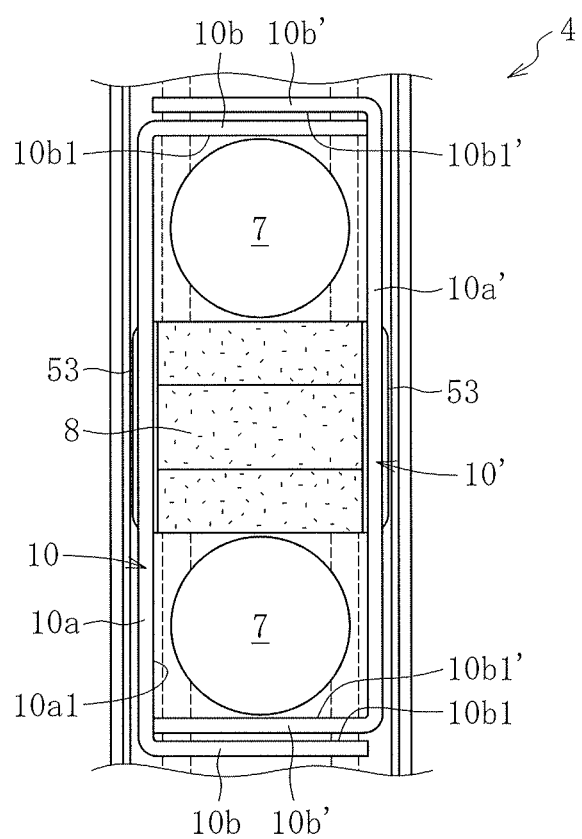
FIG. 24 is a partial exploded view illustrating the solid-lubrication rolling bearing in FIG. 22 when viewed from the outer diameter side, with an outer ring is removed.
Figure 25B:
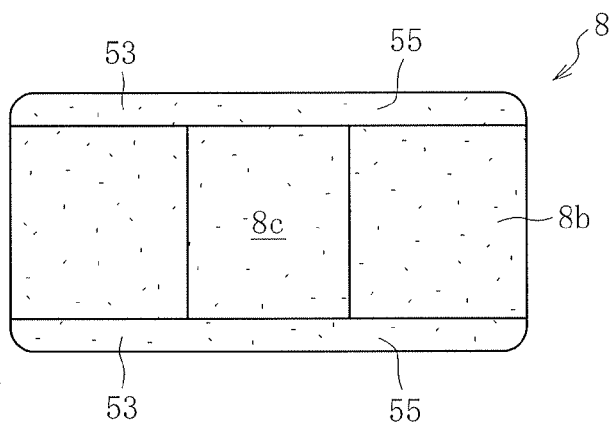
FIG. 25b is a plan view illustrating the separator in FIG. 22 when viewed from the outer diameter side.
Figure 25A:
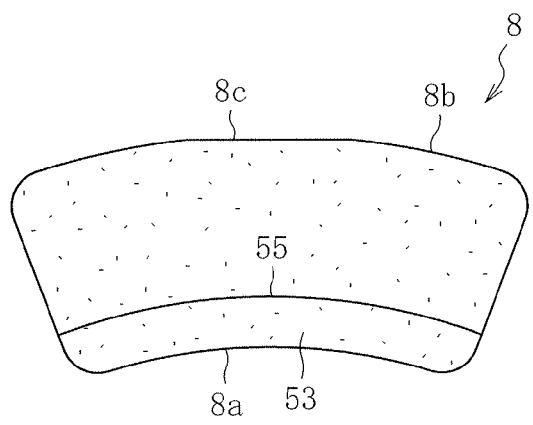
FIG. 25a is a front view illustrating a separator in FIG. 22 when viewed in the axial direction.
Figure 25C:
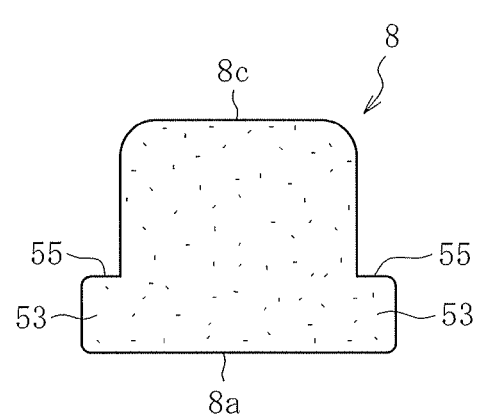
FIG. 25c is a side view illustrating the separator in FIG. 22 when viewed in the circumferential direction.

As apparent from FIG. 22, due to the male/female fitting, the upper faces 55 of the protruding portions 53 interfere with the upper edges (outer diameter ends) of the notch 66, thereby preventing the separator 8 from moving toward the outer radial side. That is, the protruding portions 53 of the separator 8 and the notches 66 of the restricting members 10 cooperate to restrict movement of the separator 8 in the radial direction. This can prevent contact between the separator 8 and the inner circumferential face 5c of the outer ring 5.

As described above, the eighth embodiment is based on the configuration in the second embodiment (FIG. 6) in the restricting members 10, but may be based on the configuration in the first embodiment (FIG. 2). In this case, it is desirable to make male/female fitting between the separator 8 and the restricting members 10 tight, to cause the restricting members 10 to hold the separator 8. When the bottom portions 10a of the restricting members 10 are disposed on both axial sides of the separator 8 as in the second embodiment, male/female fitting between the separator 8 and the restricting members 10 can be achieved on both axial sides, so that movement of the separator 8 in the axial direction is restricted. Thus, in this case, male/female fitting may be loose. However, when the restricting member 10 is disposed only one axial side as in the first embodiment, the separator 8 is cantilevered, and its free end may swing toward the outer radial side to contact the outer ring 5.

Figure 26:
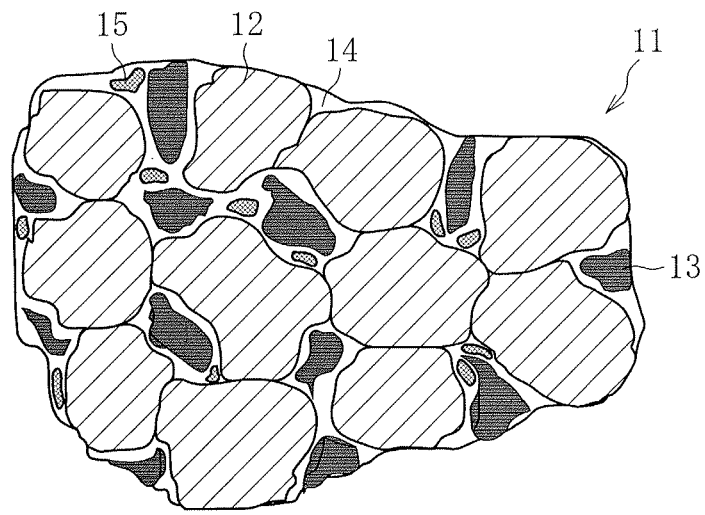
FIG. 26 is a view illustrating microstructure of a solid lubricant used in the solid-lubrication rolling bearing of the present invention.

Next, another embodiment of the solid lubricant forming the separators 8 in the embodiment will be described. FIG. 26 is an enlarged view illustrating microstructure of the solid lubricant.

As illustrated in this figure, a solid lubricant 11 is a porous body containing carbon material particles 12, graphite particles 13, a binder component 14 between the particles 12, 13, and pores 15. The carbon material particles 12 forms skeleton structure in which the adjacent carbon material particles 12 are combined with each other. The binder component 14 and the graphite particles 13 are held in the skeleton structure of the carbon material particles 12.

The solid lubricant 11 is formed by filling a forming die with powder that includes carbon material powder, graphite powder, and a binder to mold the powder into predetermined shape, and then, removing the molded product from the forming die and firing it.

According to the present invention, amorphous and self-sintering (ability to be sintered by itself) carbon material powder is used as the carbon material powder. The carbon material powder is different from crystalline graphite powder due to its amorphous property, and is different from non self-sintering carbon fiber due to its self-sintering property. Examples of the carbon material powder include coke powder and pitch powder. Both of petroleum pitch powder and coal pitch powder can be used as the pitch powder.

Both of natural graphite powder and artificial graphite powder can be used as the graphite powder. The natural graphite powder is squamous and has excellent lubricity. The artificial graphite powder has excellent moldability. Accordingly, the natural graphite powder or the artificial graphite powder is selected according to required characteristics. The graphite powder is crystalline before and after firing. For example, phenol resin can be used as the binder.

Figure 27:
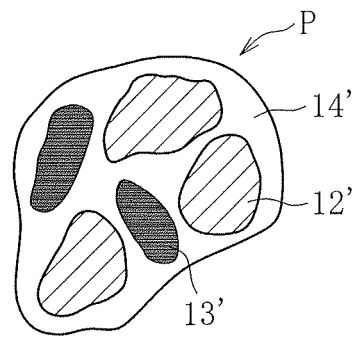
FIG. 27 is a sectional view illustrating configuration of granulated powder used in a manufacturing process of the solid lubricant.

The above-mentioned carbon material powder and graphite powder are granulated by adding the binder. Thereby, as illustrated in FIG. 27, granulated powder P in which carbon material powder 12' and graphite powder 13' are held by a binder 14' is manufactured. The carbon material powder 12' and the graphite powder 13' are fine powder and have poor fluidity, and thus, cannot be smoothly filled into the forming die. For this reason, they are granulated. The granulated powder P having a particle size of 600 μm or less (average particle diameter of 100 μm to 300 μm) is selected by pulverizing and filtering the granulated powder P.

The granulated powder thus obtained is supplied to the forming die, and is pressed to mold a green compact. At this time, for the ratio (weight ratio) of the carbon material powder 12', the graphite powder 13', and the binder 14' in the green compact, the ratio of the carbon material powder 12' is the highest, and the ratio of the binder 14' is the lowest. Specifically, the carbon material powder 12' of 50 to 60 wt % and the graphite powder 13' of 25 to 40 wt % are contained, and the remainder is occupied by binder 14' and inevitable impurities.

Then, by firing the green compact, the solid lubricant 11 illustrated in FIG. 26 can be manufactured. The firing is performed using inert gas such as nitrogen gas as atmospheric gas at temperatures of 900° C. to 1000° C. in an oven. Through the firing, the carbon material powder 12' becomes the amorphous carbon material particles 12, and the graphite powder 13' become the crystalline graphite particles 13. The binder 14' becomes the binder component 14 that is amorphous carbon. Preferably, the density of the sintered solid lubricant 11 is 1.0 to 3.0 g/cm$^3$. When the density falls below the lower limit, a crack tends to occur, and when the density exceeds the upper limit, variation in size at molding (especially, variation in size in the compressing direction) becomes large.

Figure 28:
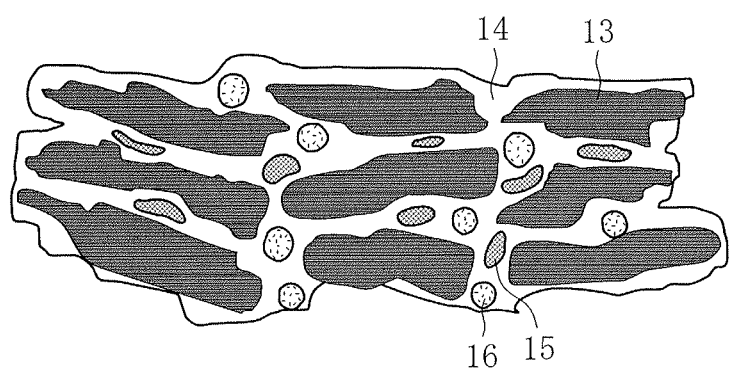
FIG. 28 is a view illustrating microstructure of a conventional solid lubricant.

FIG. 28 illustrates microstructure of a solid lubricant containing graphite as a main component in Patent literature 2. As illustrated in this figure, in the conventional solid lubricant, the graphite particles 13 are independent and are not combined with each other. The binder component only holds the graphite particles 13, and is not combined with the graphite particles 13. Thus, the material strength is low, and the graphite particles tend to fall off. A reference numeral 16 in FIG. 28 denotes an additive such as tungsten.

On the contrary, in the solid lubricant 11 according to the present invention, the carbon material particles 12 function as a base material, and are combined with each other to form the skeleton structure. The binder component 14 is amorphous and self-firing, and thus, is combined with the carbon material particles 12. Moreover, since the sintered carbon material particles 12 are hard, the sintered solid lubricant 11 has high hardness. As a result, the solid lubricant 11 has high material strength and hardness. The graphite particles 13 hardly fall off. Therefore, the solid lubricant having high lubricity as well as excellent impact resistance and wear resistance can be obtained.

The hardness of the solid lubricant 11 of the present invention reaches a Shore hardness (HSC) of about 50 to 100, and is much higher that the hardness of the existing solid lubricant described in Patent literature 2 (Shore hardness HSC: about 10 to 15). Due to the hardness, the solid lubricant 11 of the present invention can be machined later.

The bending strength of the solid lubricant 11 of the present invention is 40 to 100 MPa, which is higher than the bending strength of the existing solid lubricant a few to dozens of times. The specific wear rate of the solid lubricant 11 of the present invention is 1.0 to 2.5×10−7 mm$^3$/(N·m) and is one-hundredth of the specific wear rate of the existing solid lubricant. Thus, the life of the bearing can be extended by using the solid lubricant 11 of the present invention as the solid lubricant disposed in the rolling bearing.

The skeleton structure of the carbon material particles 12 can be replaced with a skeleton structure in which metal particles such as Fe or Cu are combined with each other. However, this configuration tends to be fragile due to oxidation. At elevated temperatures, the material becomes soft, and both of material strength and hardness are lowered, which makes it difficult to be used as the solid lubricant. On the contrary, by adopting the skeleton structure of the carbon material particles 12 according to the present invention, oxidation and softening of the material at elevated temperatures are hard to occur. Therefore, this configuration can avoid such trouble.

Other composites can be added to the solid lubricant 11 as necessary. For example, wear resistance can be improved by adding at least one of W, Mo, and $MOS_2$. This addition can compensate lowering of wear resistance, which is caused by lowering of lubricity of graphite at elevated temperatures. When the amount of added composites is too large, material strength decreases. Thus, a suitable amount is 1.0 vol % to 8.0 vol %.

To further improve wear resistance after firing, carbon fiber or carbon nanotube can be added to the solid lubricant 11. However, when the amount of the carbon fiber or carbon nanotube is too much, moldability degrades. Thus, a suitable amount is 10 wt % or less.

The separator 8 formed of the solid lubricant 11 having excellent wear resistance can prevent premature wear of the solid lubricant, and keep the lubricating effect of the solid lubricant 11 for a long period. Since the amount of solid lubricant powder from the separators 8 per unit time decreases, the amount of excess solid lubricant powder in the bearing can be suppressed, so that leakage of the solid lubricant powder can be more effectively prevented. In addition, when the separators 8 become smaller due to wear after long-term use, the rolling elements 7 collide with the thinned separators 8. However, using the solid lubricant 11 having excellent impact resistance can prevent damage on the separators 8 due to collision.

The present invention is not limited to the configuration in the above-mentioned embodiments. Although the present invention is applied to the deep groove ball bearing, the present invention can be applied to other types of bearings including angular contact ball bearings, and cylindrical roller bearings. Although the outer-ring rotating rolling bearing 4 is illustrated in the embodiments, the present invention can be also applied to an inner-ring rotating rolling bearing.

The solid lubricant according to the present invention is described to be used for the tenter clip bearing of the film stretching machine. However, the solid lubricant can be applied to various bearings (for example, bearings used in the ceramic industry) used at elevated temperatures or in a vacuum, which prevents use of grease or lubricating oil as the lubricant.

The rolling elements 7 and the separators 8 may be disposed in any manner in the circumferential direction. In the first and the second embodiments, a plurality of (for example, two) rolling elements are used as one set, and one separator 8 is disposed between the two adjacent rolling elements. The present invention can be applied to the case where the rolling element 7 and the separator 8 are alternately disposed in the circumferential direction. Any number of rolling elements 7 and separators 8 may be disposed between two restricting portions of one restricting member.

REFERENCE SIGNS LIST

1: Guide rail
2: Frame
3: Clip
4: Solid-lubrication rolling bearing
5: Outer ring
5a: Outer raceway face
6: Inner ring
6a: Inner raceway face
7: Rolling element (ball)
8: Separator
9: Sealing member (shield plate)
10, 10': Restricting member
10a, 10a': bottom portion
10a1, 10a1': inner side face
10b, 10b': restricting portion
10b1, 10b1' inner side face

The invention claimed is:

1. A solid-lubrication rolling bearing comprising:
an outer ring having an outer raceway face;
an inner ring having an inner raceway face;
a plurality of rolling elements disposed between the outer raceway face and the inner raceway face; and
a separator disposed between the adjacent rolling elements, the separator being formed of a solid lubricant, wherein
relative movement of the adjacent rolling elements and the separator in a direction of separating apart in a circumferential direction is restricted by restricting members, and
the restricting members are disposed at a plurality of places in the circumferential direction to allow relative movement between the adjacent restricting members.

2. The solid-lubrication rolling bearing according to claim 1, wherein
the solid lubricant is formed by molding and firing powder that includes amorphous and self-sintering carbon material powder, graphite powder, and a binder.

3. The solid-lubrication rolling bearing according to claim 1, wherein
a receptacle for the solid lubricant powder is provided on an axial outer side of the restricting member.

4. The solid-lubrication rolling bearing according to claim 3, further comprising:
a seal member disposed on the axial outer side of the restricting member, the seal member sealing a space between the inner ring and the outer ring, and a shielding member opposed to the seal member in an axial direction, the shielding member extending in a radial direction.

5. The solid-lubrication rolling bearing according to claim 4, wherein
the shielding member is disposed on an axial inner side of the seal member, and the shielding member forms the receptacle for the solid lubricant powder.

6. The solid-lubrication rolling bearing according to claim 4, wherein
a labyrinth gap is formed between the shielding member and the seal member.

7. The solid-lubrication rolling bearing according to claim 1, further comprising a structure that prevents contact between the outer ring and the separator.

8. The solid-lubrication rolling bearing according to claim 1, wherein
   each of the restricting members includes a bottom portion extending between the outer ring and the inner ring in the circumferential direction, and a restricting portion extending from the bottom portion in a space between the inner raceway face and the outer raceway face.

9. The solid-lubrication rolling bearing according to claim 8, wherein
   an inner side face of each of the bottom portion and the restricting portion is a flat face having no curvature.

10. The solid-lubrication rolling bearing according to claim 8, wherein
    a seal member that seals the space between the inner ring and the outer ring is disposed on an axial outer side of the bottom portion of the restricting member.

11. The solid-lubrication rolling bearing according to claim 8, wherein
    an outer diameter end and an inner diameter end of the bottom portion is made close to an inner circumferential face of the outer ring and an outer circumferential face of the inner ring.

12. The solid-lubrication rolling bearing according to claim 1, wherein
    a pair of the restricting members are disposed on both axial sides of the rolling element and the separator, and
    the pair of restricting members, and the rolling element and the separator that are accommodated within the restricting members are regarded as one unit, and the units are disposed at a plurality of places in the circumferential direction to allow relative movement between the units.

13. The solid-lubrication rolling bearing according to claim 12, wherein
    the restricting members have an identical shape.

14. The solid-lubrication rolling bearing according to claim 1, wherein
    the restricting members have an identical shape.

15. The solid-lubrication rolling bearing according to claim 1, used in a tenter clip of a film stretching machine.

* * * * *